United States Patent
Zhao et al.

(10) Patent No.: US 12,082,237 B2
(45) Date of Patent: Sep. 3, 2024

(54) APPARATUS AND METHOD OF WIRELESS COMMUNICATION OF SAME

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 284 days.

(21) Appl. No.: 17/525,475

(22) Filed: Nov. 12, 2021

(65) Prior Publication Data
US 2022/0078802 A1 Mar. 10, 2022

Related U.S. Application Data

(63) Continuation of application No. PCT/CN2020/077562, filed on Mar. 3, 2020.

(60) Provisional application No. 62/849,237, filed on May 17, 2019.

(51) Int. Cl.
H04W 72/56 (2023.01)
H04L 1/1812 (2023.01)
H04L 5/00 (2006.01)
H04W 72/0446 (2023.01)

(52) U.S. Cl.
CPC ........... *H04W 72/56* (2023.01); *H04L 1/1812* (2013.01); *H04L 5/0053* (2013.01); *H04W 72/0446* (2013.01)

(58) Field of Classification Search
None
See application file for complete search history.

(56) References Cited

U.S. PATENT DOCUMENTS

| 11,811,689 B2 * | 11/2023 | Zhao ............... H04L 5/0048 |
| 2017/0195089 A1 | 7/2017 | Lee et al. |
| 2018/0287763 A1 | 10/2018 | Baghel et al. |
| 2018/0351707 A1 | 12/2018 | Wang et al. |
| 2019/0090220 A1 | 3/2019 | Li et al. |

(Continued)

FOREIGN PATENT DOCUMENTS

| CN | 106416355 A | 2/2017 |
| CN | 109691146 A | 4/2019 |

OTHER PUBLICATIONS

First Office Action issued in corresponding Chinese Application No. 202111384187.6, mailed Jan. 19, 2023.

(Continued)

*Primary Examiner* — Chi H Pham
*Assistant Examiner* — Raul Rivas
(74) *Attorney, Agent, or Firm* — BAYES PLLC

(57) ABSTRACT

An equipment and a method for wireless communication of the same are provided. The method includes a first user equipment transmitting, to a second user equipment, a first sidelink data packet with a first priority in a slot set. The method also includes the first user equipment performing a sidelink feedback channel detection in a slot from the second user equipment. The sidelink feedback channel transmitted in the slot corresponds to the first sidelink data packet transmitted within the slot set.

17 Claims, 3 Drawing Sheets

(56) References Cited

U.S. PATENT DOCUMENTS

2022/0361192 A1* 11/2022 Bharadwaj ............ H04W 72/51

OTHER PUBLICATIONS

First Office Action issued in corresponding European Application No. 20810495.0, mailed Jan. 25, 2023.
Extended European Search Report issued in corresponding European Application No. 20810495.0, mailed Apr. 26, 2022, 16 pages.
"Discussion on physical layer procedures for NR sidelink", R1-1907018, Source: LG Electronics, 3GPP TSG RAN WG1 Meeting #97, Reno, USA, May 13-17, 2019, 11 pages.
International Search Report issued in corresponding International Application No. PCT/CN2020/077562, mailed May 27, 2020, 23 pages.
PCT Written Opinion of the International Searching Authority issued in corresponding International Application No. PCT/CN2020/077562, mailed May 27, 2020, 4 pages.
"Sidelink physical layer structure in NR V2X", Agenda Item: 7.2.4.1, Source: CATT, 3GPP TSG RAN WG1 Meeting #97, R1-1906314, Reno, USA, May 13-17, 2019, 15 pages.
Third Office Action issued in corresponding European Application No. 20810495.0, mailed Jan. 4, 2024.
Source: LG Electronics; Title: Feature lead summary for agenda item 7.2.4.5 Physical layer procedures for sidelink 3GPP TSG RAN WG1 #97 R1-1907682 Reno, USA, May 13-17, 2019.
Source: MediaTek Inc.; Title: On sidelink mode-2 resource allocation 3GPP TSG RAN WG1 Meeting #97 R1-1906555 Reno, USA, May 13-17, 2019.

* cited by examiner

APPARATUS AND METHOD OF WIRELESS COMMUNICATION OF SAME

CROSS-REFERENCE TO RELATED APPLICATION

This application is a continuation of International Application No. PCT/CN2020/077562, filed on Mar. 3, 2020, which claims the benefit of priority to U.S. Application No. 62/849,237, filed on May 17, 2019, both of which are hereby incorporated by reference in their entireties.

BACKGROUND

The present disclosure relates to the field of communication systems, and more particularly, to an apparatus and a method of wireless communication of the same.

In new radio vehicle-to-everything (NR-V2X) technologies, unicast, groupcast, and broadcast are all supported and discussed. For the unicast, to improve reliability and resource efficiency, a feedback channel is needed. A first user equipment can feedback some information to a second user equipment to assist a re-transmission of the second user equipment. How to design the feedback channel needs to be considered in the NR-V2X technologies.

SUMMARY

In a first aspect of the present disclosure, a method of wireless communication of a first user equipment includes the first user equipment transmitting, to a second user equipment, a first sidelink data packet with a first priority in a slot set, the first user equipment performing a sidelink feedback channel detection in a slot from the second user equipment, and wherein a sidelink feedback channel transmitted in the slot corresponds to a sidelink data packet transmitted within the slot set.

In a second aspect of the present disclosure, a first user equipment for wireless communication includes a memory, a transceiver, and a processor coupled to the memory and the transceiver. The transceiver is configured to transmit, to a second user equipment, a first sidelink data packet with a first priority in a slot set. The processor is configured to perform a sidelink feedback channel detection in a slot from the second user equipment. A sidelink feedback channel transmitted in the slot corresponds to a sidelink data packet transmitted within the slot set.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF THE DRAWINGS

In order to more clearly illustrate the embodiments of the present disclosure or related art, the following figures described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
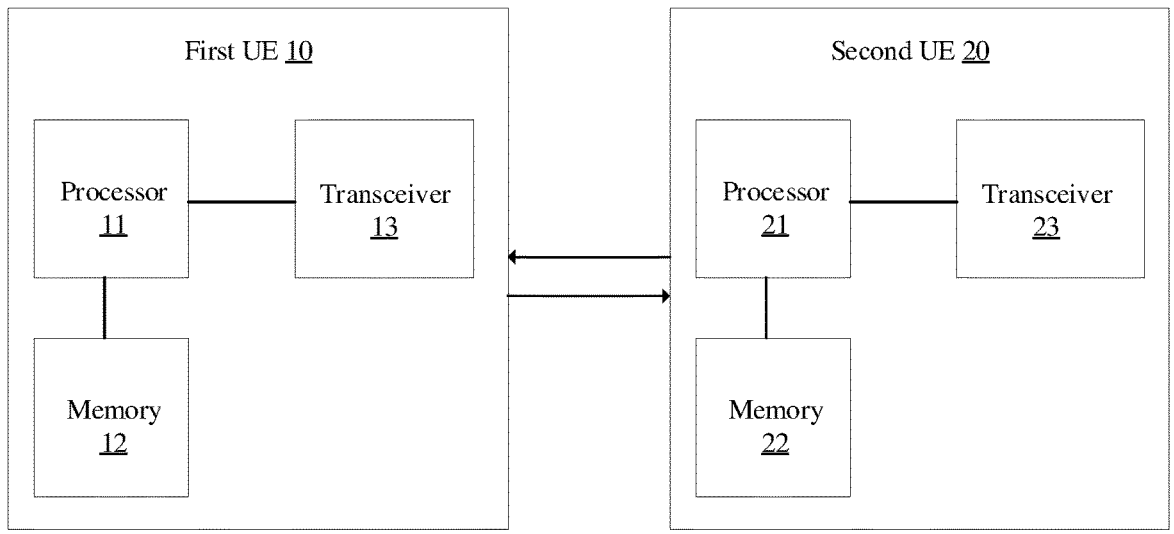
FIG. 1 is a block diagram of a first user equipment and a second user equipment for wireless communication according to an embodiment of the present disclosure.

FIG. 1 illustrates that, in some embodiments, a first user equipment (UE) 10 and a second UE 20 for wireless communication according to an embodiment of the present disclosure are provided. The first UE 10 may include a processor 11, a memory 12, and a transceiver 13. The second UE 20 may include a processor 21, a memory 22, and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface. Embodiments of the present disclosure can be applied to any system which is based on sidelink communication, such as device-to-device (D2D).

In some embodiments, the transceiver 13 is configured to transmit, to the second user equipment 20, a first sidelink data packet with a first priority in a slot set. The processor 11 is configured to perform a sidelink feedback channel detection in a slot from the second user equipment 20. A sidelink feedback channel transmitted in the slot corresponds to a sidelink data packet transmitted within the slot set.

In some embodiments, the sidelink feedback channel corresponds to the first sidelink data packet. The processor 11 is configured to perform a sidelink feedback channel detection in a slot from the second user equipment 20. In details, the processor 11 is configured to perform the sidelink feedback channel detection based on the first transmitted sidelink data packet. For example, if the transmission resource of sidelink feedback channel is determined by the transmission resource of physical sidelink control channel (PSCCH) or physical sidelink shared channel (PSSCH) which is used to carry the first sidelink data packet, the processor 11 performs the sidelink feedback channel detection based on the PSCCH or PSSCH that is used to carry the first sidelink data packet.

In some embodiments, the transceiver 13 is configured to transmit, to the second user equipment 20, a second sidelink data packet with a second priority in the slot set. If the second priority is higher than the first priority, the processor 11 performs the transmission of the second sidelink data packet. If the second priority is lower than or equal to the first priority, the processor 11 drops the transmission of the second sidelink data packet.

In some embodiments, other parameters, such as latency or reliability, instead of priority, are used to determine whether to perform or drop the transmission. For example, the transceiver 13 is configured to transmit, to the second user equipment 20, a second sidelink data packet with a second latency in the slot set. If the second latency is less than the first latency of the first sidelink data packet, the processor 11 performs the transmission of the second sidelink data packet. For example, the latency requirement of the second sidelink data packet is 3 ms, and the latency requirement of the first sidelink data packet is 10 ms, then the processor 11 performs the transmission of the second sidelink data packet. If the second latency is larger than or equal to the first latency, the processor 11 drops the transmission of the second sidelink data packet.

In some embodiments, the processor 11 performing the sidelink feedback channel detection in the slot from the second user equipment 20 includes the processor 11 performing the sidelink feedback channel detection based on the second transmitted sidelink data packet to the first transmitted sidelink data packet in an order from first to second. In some embodiments, the processor 11 performing the sidelink feedback channel detection in the slot from the second user equipment 20 includes the processor 11 performing a sidelink feedback channel detection based on a sidelink data packet with higher priority to a sidelink data packet with lower priority in an order from first to second. For example, if both the first and second sidelink data packets are transmitted to the second user equipment, the first user equipment will perform the sidelink feedback channel detection based on the second sidelink data packet firstly. If the sidelink feedback channel detection is successful, the first user equipment can stop the sidelink feedback detection. If not, the first user equipment will perform the sidelink feedback channel detection based on the first sidelink data packet.

In some embodiments, the processor 11 is configured to receive, from the second user equipment 20, a third sidelink data packet with a third priority in the slot set. If the first priority is higher than the third priority, the processor 11 performs a sidelink feedback channel detection in the slot from the second user equipment 20. If the first priority is lower than or equal to the third priority, the processor 11 transmits a sidelink feedback channel in the slot to the second user equipment 20.

In some embodiments, the sidelink data packet is carried on a physical sidelink shared channel (PSSCH), and the sidelink feedback channel is a physical sidelink feedback channel (PSFCH). In some embodiments, the sidelink feedback channel carries a hybrid automatic repeat request (HARQ) acknowledgement information or negative acknowledgement information.

Figure 2:
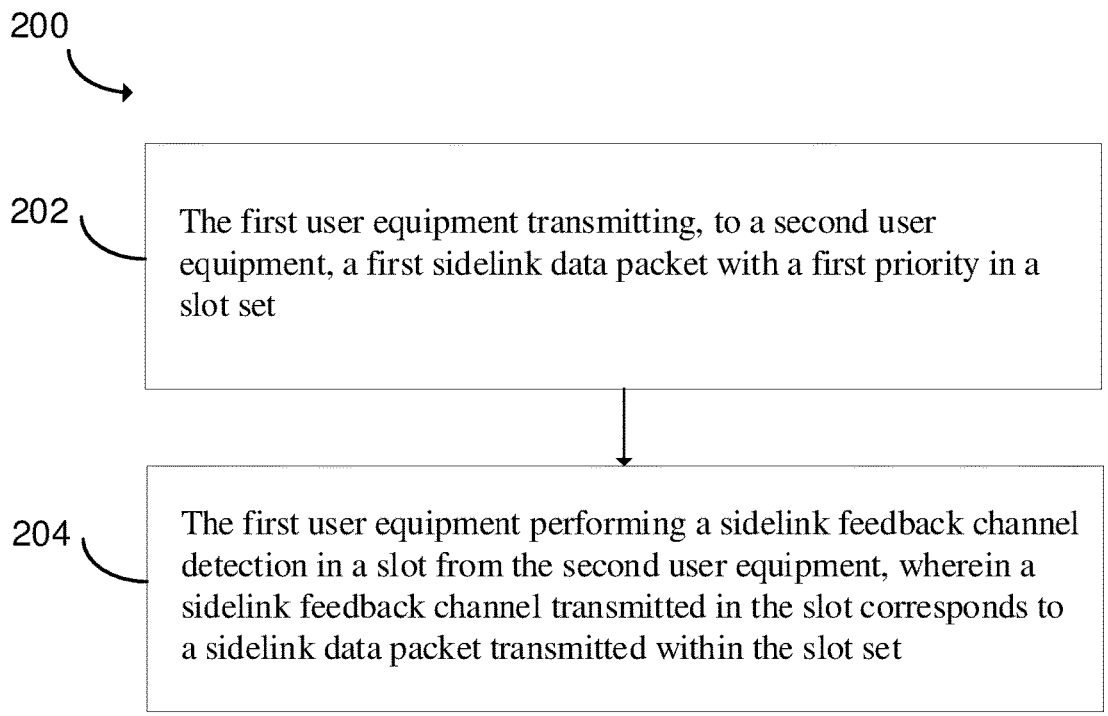
FIG. 2 is a flowchart illustrating a method of wireless communication of a first user equipment according to an embodiment of the present disclosure.

FIG. 2 illustrates a method 200 of wireless communication of a first user equipment according to an embodiment of the present disclosure. In some embodiments, the method 200 includes: a block 202, the first user equipment transmitting, to a second user equipment, a first sidelink data packet with a first priority in a slot set, and a block 204, the first user equipment performing a sidelink feedback channel detection in a slot from the second user equipment, wherein a sidelink feedback channel transmitted in the slot corresponds to a sidelink data packet transmitted within the slot set. In some embodiments, the sidelink feedback channel corresponds to the first sidelink data packet.

In some embodiments, the first user equipment is configured to transmit, to the second user equipment, a second sidelink data packet with a second priority in the slot set. If the second priority is higher than the first priority, the first user equipment performs the transmission of the second sidelink data packet. If the second priority is lower than or equal to the first priority, the first user equipment drops the transmission of the second sidelink data packet.

In some embodiments, the first user equipment performing the sidelink feedback channel detection in the slot from the second user equipment includes the first user equipment performing the sidelink feedback channel detection based on the second transmitted sidelink data packet to the first transmitted sidelink data packet in an order from first to second. In some embodiments, the first user equipment performing the sidelink feedback channel detection in the slot from the second user equipment includes the first user equipment performing a sidelink feedback channel detection based on a sidelink data packet with higher priority to a sidelink data packet with lower priority in an order from first to second.

In some embodiments, the first user equipment is configured to receive, from the second user equipment, a third sidelink data packet with a third priority in the slot set. If the first priority is higher than the third priority, the first user equipment performs a sidelink feedback channel detection in the slot from the second user equipment. If the first priority is lower than or equal to the third priority, the first user equipment transmits a sidelink feedback channel in the slot to the second user equipment.

In some embodiments, the sidelink data packet is carried on a physical sidelink shared channel (PSSCH), and the sidelink feedback channel is a physical sidelink feedback channel (PSFCH). In some embodiments, the sidelink feedback channel carries a hybrid automatic repeat request (HARQ) acknowledgement information or negative acknowledgement information.

Figure 3:
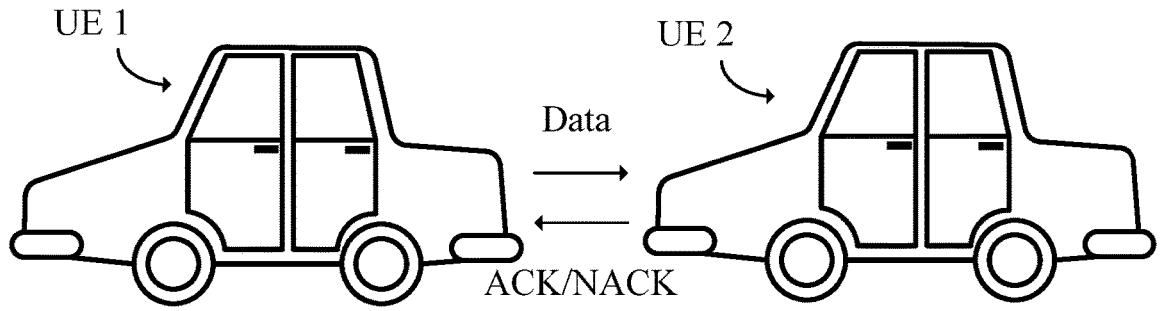
FIG. 3 is a schematic diagram of an exemplary illustration of a transmission and a feedback of user equipments according to an embodiment of the present disclosure.

FIG. 3 illustrates that, in some embodiments, in new radio V2X (NR-V2X), unicast, groupcast, and broadcast are all supported and discussed. For unicast, to improve reliability and resource efficiency, feedback channel on sidelink (SL) is introduced. A receiver UE (RX UE), such as a UE 2 can feedback a hybrid automatic repeat request (HARQ) acknowledgement (ACK) or a HARQ negative acknowledgement (NACK) to a transmitter UE (TX UE), such as UE 1 to assist transmitter's re-transmission. Based on the feedback from the RX UE, the TX UE can determine whether to do re-transmission or a new transmission. In NR-V2X sidelink, a physical layer channel which is used to carry HARQ ACK/NACK is introduced, physical sidelink feedback channel (PSFCH). For PSFCH carrying HARQ ACK/NACK, it can only occupy the last several OFDM symbols (OS) within a slot/subframe. For example, there are 14 OFDM symbols per slot, the PSFCH can only be transmitted at the last second OS, considering that the last OS is used for a guard period (GP).

Figure 4:
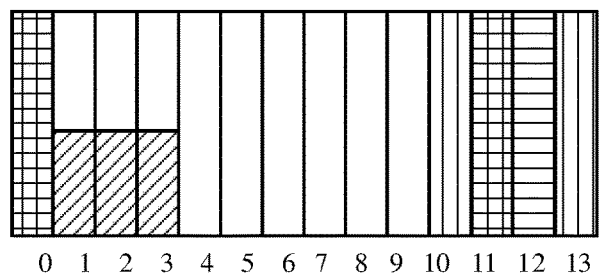
FIG. 4 is a schematic diagram of an exemplary illustration of a physical channel according to an embodiment of the present disclosure.

FIG. 4 illustrates that, in some embodiments, one example of the PSFCH is illustrated below. The transmission resource of PSFCH can be determined by at least one of the following methods.

1. By gNB/eNB: if the transmission resource of SL is allocated by a network, then the transmission resource of PSFCH can also be allocated or determined by the network, such as gNB or eNB.
2. By TX UE: the TX UE can determine the transmission resource of PSFCH which is transmitted by RX UE. Such as the PSCCH of TX UE can indicate transmission resource of PSFCH in time and/or frequency and/or code domain.
3. By transmission resource of the corresponding PSSCH implicitly: the PSFCH carries HARQ ACK/NACK corresponding to the PSSCH which is used to carry sidelink data packet of TX UE. If there is a pre-configured mapping between transmission resource of PSSCH and PSFCH, then the transmission resource of PSFCH can be implicitly determined by the corresponding PSSCH. For example, the timing gap between PSFCH and corresponding PSSCH is 2 slots. Then if PSSCH transmitted in slot n, the corresponding PSFCH will be transmitted in slot n+2. The frequency starting position of PSFCH can be aligned to the corresponding PSSCH, and the frequency length of PSFCH can be fixed to 1 or 2 PRBs.

Figure 5:
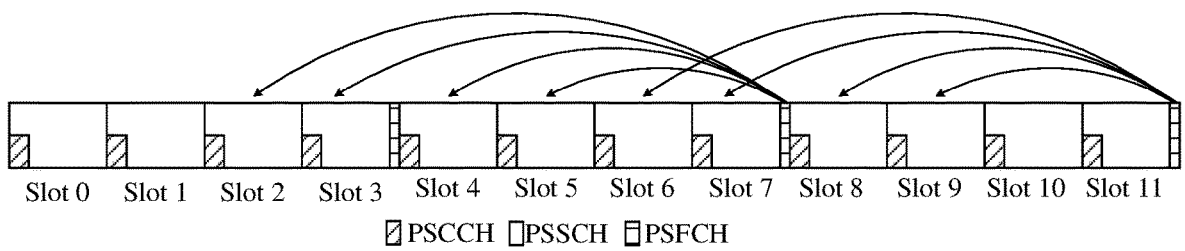
FIG. 5 is a schematic diagram of an exemplary illustration of a physical channel according to an embodiment of the present disclosure.

FIG. 5 illustrates that, in some embodiments, in NR-V2X, it is supported that the PSFCH can exist in every N slots, where N is an integer and N>=1. For N=1, that means PSFCH can exist in each slot. For N>1, there can be one slot per N slots within which PSFCH can be transmitted. One example of N>1 is shown below. In FIG. 5, N=4, which means there is only one slot used for PSFCH transmission per every 4 slots. For simplicity, it does not show the AGC and GP symbols of each slot. In FIG. 5, the slots used for PSFCH transmission are slots 3, 7, and 11. For each PSFCH slot, it corresponds to 4 slots used for PSSCH transmission which can be seen as a slot set. For example, the slot 7, which is used for PSFCH transmission, corresponds to the slot set which includes slots {2,3,4,5}, which means the HARQ ACK/NACK corresponds to the PSSCH transmission within slot set of slots {2,3,4,5} will be fed back by PSFCH in slot 7. The slot 11, which is used for PSFCH transmission, corresponds to the PSSCH transmission within slot set which includes slots {6,7,8,9}. The timing gap between the slot used for PSFCH and the first or last slot of the slot set that it corresponds to can be (pre-)configured or determined by the minimal processing capability of a UE.

In some embodiments, if UE 1 transmits PSSCH to UE 2 in slot 2, UE 2 needs to transmit HARQ feedback (on PSFCH) to UE 1 in slot 7. Similarly, if UE 2 transmits PSSCH to UE 1 in slot 3, UE 1 needs to transmit HARQ feedback (on PSFCH) to UE 2 in slot 7. Then in slot 7, UE 1 needs to both transmit and receive PSFCH. Because of half-duplex limitation, it cannot receive and transmit at the same time in a carrier. How will UE 1 do. Some embodiments of the present disclosure aim to provide a technical solution to solve above issues.

In some embodiments, if UE 1 transmits PSSCH 1 and PSSCH 2 to UE 2 in slot 2 and slot 3 separately, UE 2 needs to transmit HARQ feedback to UE 1 corresponding to PSSCH 1 and PSSCH 2 separately. Then UE 2 will transmit two PSFCHs in slot 7. If UE 2 cannot support to transmit 2 separate feedback channels at the same time, how will UE 2 do. Some embodiments of the present disclosure aim to provide a technical solution to solve above issues. Some embodiments of the present disclosure are to propose the following.

In some embodiments, if a first UE receives multiple PSSCHs from a second UE within the same slot set which need to do HARQ feedback within the same slot, the first UE will only do HARQ feedback corresponding to the last received PSSCH to the second UE. In case of N>1, 1 slot for HARQ feedback corresponds to a slot set for PSSCH transmission, which means, the PSSCH transmitted within the slot set will be fed back in the same slot. For example, in FIG. 5, N=4, the slot 7 which is used for feedback corresponding to the PSSCH transmitted within the slot set {2 3 4 5}.

For example, if UE 1 transmits PSSCH1 to UE 2 in slot 2, UE 2 needs do HARQ feedback in slot 7. It is possible that UE 1 transmits PSSCH 2 to UE 2 in slot 4. For example, after UE 1 transmitting PSSCH 1 to UE 2, a new packet with lower latency or higher priority has to be transmitted, then it can transmit PSSCH 2 to UE 2 in slot 4 to promise that the packet can be transmitted within the delay budget. Therefore, within the slot set corresponding to the same feedback slot, for a unicast session, the latter transmission has higher priority. Otherwise, there is no reason for transmitter UE to transmit the PSSCH in later slot which will cause feedback collision at receiver side.

For the receiver, such as UE 2, it receives both PSSCH 1 and PSSCH 2, then it needs to do HARQ feedback corresponding to them separately in slot 7. While because it cannot transmit two separate feedback channels at the same time, it has to drop one of HARQ feedback. It can only transmit HARQ feedback to UE 1 corresponds to the last received PSSCH 2 which has higher priority. In some embodiments, the transmission resource of HARQ feedback can be determined by slot index, and frequency resource of the corresponding PSSCH or its associated PSCCH.

For the transmitter, such as UE 1, if it transmits multiple PSSCHs within the slot set to the same receiver, such as UE 2, the UE 1 does not know whether all of PSSCHs have been received by the receiver, or which has been correctly received by the receiver. For example, if UE 1 transmits PSSCH 1 in slot 2, and PSSCH 2 in slot 4 to UE 2 separately, there are three possibilities as below.

1. UE 2 receives both PSCCH 1(corresponding to the associated PSSCH 1) and PSCCH 2(corresponding to the associated PSSCH 2) correctly, then UE 2 does HARQ feedback based on PSCCH 2 and PSSCH 2.

2. UE 1 can only receive PSCCH 1 correctly, UE 1 detects PSCCH 2 failed, then UE 2 does HARQ feedback based on PSCCH 1 and PSSCH 1.
3. UE 1 can only receive PSCCH 2 correctly, UE 1 detects PSCCH 1 failed, then UE 2 does HARQ feedback based on PSCCH 2 and PSSCH 2.

In some embodiments, the transmitter can do HARQ feedback detection based on the last transmitted PSSCH (or its associated PSCCH) firstly, then the second last transmitted PSSCH (or its associated PSCCH), and so on. For example, if UE 1 transmits PSSCH 1 in slot 2 and PSSCH 2 in slot 4 to UE 2, then UE 1 can do HARQ feedback detection based on PSSCH 2 (or PSCCH 2 which is associated to PSSCH 2) firstly. If UE 1 can detect HARQ feedback from UE 2, then UE 1 can stop further detection. Otherwise, UE 1 will continue HARQ feedback detection based on PSSCH 1(or PSCCH 1 which is associated to PSSCH 1).

In some embodiments, if a first UE receive a first PSSCH in a slot within the slot set from a second UE which needs HARQ feedback, the first UE plans to transmit a second PSSCH to the second UE in another slot within the same slot set, but with a lower priority than the first PSSCH, the UE will drop the second PSSCH transmission.

In some embodiments, the UE will trigger resource selection. The resource selection criterion is as below.
1. Within the slot set corresponds to the same HARQ feedback slot, UE 1 receives a first PSSCH from UE 2 and needs to do HARQ feedback.
2. UE 1 plans to transmit a second PSSCH to UE 2 in a later slot within the slot set which needs HARQ feedback.
3. The priority of the first PSSCH from UE 2 is higher than the priority of the second PSSCH of UE 1.

If the above criterions are satisfied, UE 1 needs to drop the planed transmission and perform resource re-selection for the second PSSCH. Furthermore, UE 1 will do HARQ feedback to UE 2 corresponding to the first PSSCH.

In some embodiments, the priority of PSSCH is carried in PSCCH.

In some embodiments, other parameter, such as latency or reliability, instead of priority, is used.

In some embodiments, for UE 1, if UE 1 receives a first PSSCH from UE 2 after transmitting a second PSSCH to UE 2, and the priority of the first PSSCH from UE 2 is lower than the second PSSCH transmitted to UE 2, UE 1 will not do HARQ feedback to UE 2. UE 1 will do HARQ feedback detection to determine whether there is HARQ feedback from UE 2.

In some embodiments, for UE 1, if UE 1 receives a first PSSCH from UE 2 after transmitting a second PSSCH to UE 2, and the priority of the first PSSCH from UE 2 is higher than the second PSSCH transmitted to UE 2, UE 1 will do HARQ feedback corresponding to the first PSSCH to UE 2.

In summary, some embodiments of the present disclosure target for the issues descripted in previous embodiments. The feedback channel can be as follows.
1. For RX UE, If RX UE receives multiple PSSCHs from TX UE within the same slot set, the RX UE can only do HARQ feedback corresponding to the last received PSSCH from the TX UE within the slot set.
2. For TX UE, if TX UE transmits a PSSCH to RX UE within a slot set, TX UE can only transmit another PSSCH with higher priority in the same slot set to the RX UE. If multiple PSSCHs are transmitted to the same RX UE within a slot set, TX UE does HARQ feedback detection based on the last transmitted PSSCH firstly, then based on the second last transmitted PSSCH secondly and so on.
3. Within a slot set, if UE 2 receives a first PSSCH from UE 1 which needs HARQ feedback, and UE 2 plans to transmit a second PSSCH which needs HARQ feedback to UE 1 in a later slot within the same slot set, and the priority of the first PSSCH is higher than the priority of the second PSSCH, UE 2 will drop the transmission of the second PSSCH. Alternatively, UE 2 will do resource re-selection. UE 2 will do HARQ feedback corresponding to the first PSSCH to UE 1.
4. Trigger criterion for resource reselection can be as follows. Within the slot set corresponds to the same HARQ feedback slot, UE 2 receives a first PSSCH from UE 1 and needs to do HARQ feedback. UE 2 plans to transmit a second PSSCH to UE 1 in a later slot within the same slot set which needs HARQ feedback. The priority of the first PSSCH is higher than the priority of the second PSSCH. UE 2 will do resource reselection.

Some embodiments of the present disclosure are to propose an apparatus and a method of wireless communication of the same capable of improving reliability and resource efficiency using a feedback channel. The embodiment of the present disclosure is a combination of techniques/processes that can be adopted in 3GPP specification to create an end product.

Figure 6:
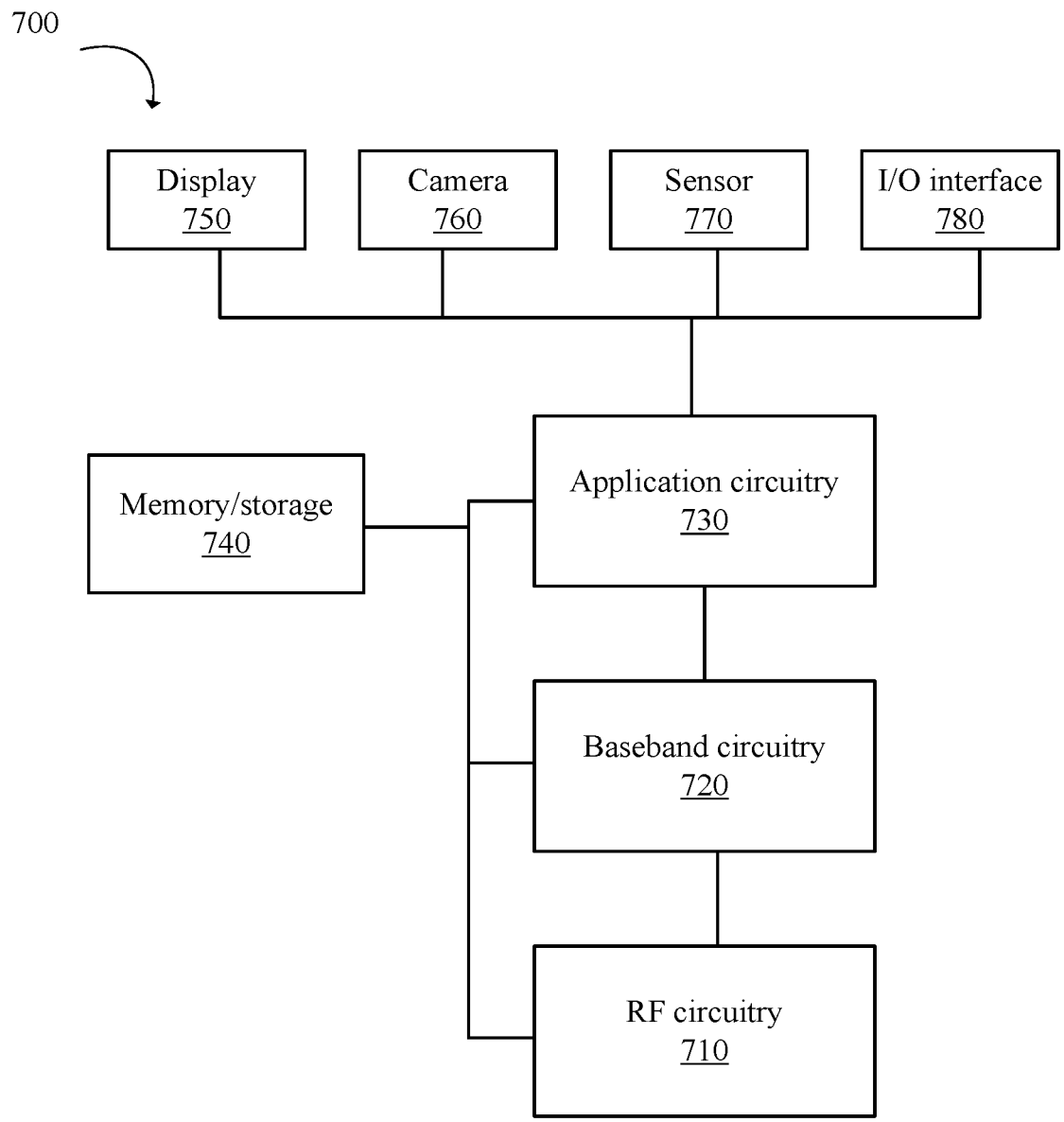
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method for wireless communication of a first user equipment, comprising:
the first user equipment transmitting, to a second user equipment, a first sidelink data packet with a first priority in a slot set; and
the first user equipment receiving, from the second user equipment, a third sidelink data packet with a third priority in the slot set, wherein:
if the first priority is higher than the third priority, the first user equipment performs a sidelink feedback channel detection in a slot from the second user equipment, wherein the sidelink feedback channel transmitted in the slot corresponds to the first sidelink data packet transmitted within the slot set; and
if the first priority is lower than or equal to the third priority, the first user equipment transmits a sidelink feedback channel in the slot to the second user equipment.

2. The method of claim 1, wherein the first user equipment is configured to transmit, to the second user equipment, a second sidelink data packet with a second priority in the slot set;
if the second priority is higher than the first priority, the first user equipment performs the transmission of the second sidelink data packet; and
if the second priority is lower than or equal to the first priority, the first user equipment drops the transmission of the second sidelink data packet.

3. The method of claim 2, wherein the first user equipment performing the sidelink feedback channel detection in the slot from the second user equipment comprises:
the first user equipment performing the sidelink feedback channel detection based on the second transmitted sidelink data packet to the first transmitted sidelink data packet in an order from first to second.

4. The method of claim 2, wherein the first user equipment performing the sidelink feedback channel detection in the slot from the second user equipment comprises:
the first user equipment performing a sidelink feedback channel detection based on a sidelink data packet with a higher priority to a sidelink data packet with a lower priority in an order from first to second.

5. The method of claim 1, wherein the sidelink data packet is carried on a physical sidelink shared channel (PSSCH), and the sidelink feedback channel is a physical sidelink feedback channel (PSFCH).

6. The method of claim 1, wherein the sidelink feedback channel carries a hybrid automatic repeat request (HARQ) acknowledgement information or negative acknowledgement information.

7. A first user equipment for wireless communication, comprising:
a memory;
a transceiver; and
a processor coupled to the memory and the transceiver,
wherein the transceiver is configured to transmit, to a second user equipment, a first sidelink data packet with a first priority in a slot set,
wherein the transceiver is further configured to receive, from the second user equipment, a third sidelink data packet with a third priority in the slot set;
if the first priority is higher than the third priority, the processor performs a sidelink feedback channel detection in a slot from the second user equipment, wherein the sidelink feedback channel transmitted in the slot corresponds to the first sidelink data packet transmitted within the slot set, and
if the first priority is lower than or equal to the third priority, the processor transmits a sidelink feedback channel in the slot to the second user equipment.

8. The first user equipment of claim 7, wherein:
the transceiver is configured to transmit, to the second user equipment, a second sidelink data packet with a second priority in the slot set;
if the second priority is higher than the first priority, the processor performs the transmission of the second sidelink data packet; and
if the second priority is lower than or equal to the first priority, the processor drops the transmission of the second sidelink data packet.

9. The first user equipment of claim 8, wherein the processor is further configured to:
perform the sidelink feedback channel detection based on the second transmitted sidelink data packet to the first transmitted sidelink data packet in an order from first to second.

10. The first user equipment of claim 8, wherein the processor is further configured to:
perform a sidelink feedback channel detection based on a sidelink data packet with a higher priority to a sidelink data packet with a lower priority in an order from first to second.

11. The first user equipment of claim 7, wherein the sidelink data packet is carried on a physical sidelink shared channel (PSSCH), and the sidelink feedback channel is a physical sidelink feedback channel (PSFCH).

12. The first user equipment of claim 7, wherein the sidelink feedback channel carries a hybrid automatic repeat request (HARQ) acknowledgement information or negative acknowledgement information.

13. A non-transitory machine-readable storage medium having stored thereon instructions that, when executed by a computer, cause the computer to perform a method for wireless communication of a first user equipment, the method comprising:
the first user equipment transmitting, to a second user equipment, a first sidelink data packet with a first priority in a slot set; and
the first user equipment receiving, from the second user equipment, a third sidelink data packet with a third priority in the slot set, wherein:
if the first priority is higher than the third priority, the first user equipment performs a sidelink feedback channel detection in a slot from the second user equipment, wherein the sidelink feedback channel transmitted in the slot corresponds to the first sidelink data packet transmitted within the slot set; and
if the first priority is lower than or equal to the third priority, the first user equipment transmits a sidelink feedback channel in the slot to the second user equipment.

14. The non-transitory machine-readable storage medium of claim 13, wherein the first user equipment is configured to transmit, to the second user equipment, a second sidelink data packet with a second priority in the slot set;
if the second priority is higher than the first priority, the first user equipment performs the transmission of the second sidelink data packet; and if the second priority is lower than or equal to the first priority, the first user equipment drops the transmission of the second sidelink data packet.

15. The non-transitory machine-readable storage medium of claim 14, wherein the first user equipment performing the sidelink feedback channel detection in the slot from the second user equipment comprises:
   the first user equipment performing the sidelink feedback channel detection based on the second transmitted sidelink data packet to the first transmitted sidelink data packet in an order from first to second; or
   the first user equipment performing a sidelink feedback channel detection based on a sidelink data packet with a higher priority to a sidelink data packet with a lower priority in an order from first to second.

16. The non-transitory machine-readable storage medium of claim 13, wherein the sidelink data packet is carried on a physical sidelink shared channel (PSSCH), and the sidelink feedback channel is a physical sidelink feedback channel (PSFCH).

17. The non-transitory machine-readable storage medium of claim 13, wherein the sidelink feedback channel carries a hybrid automatic repeat request (HARQ) acknowledgement information or negative acknowledgement information.

* * * * *